G. W. CARTWRIGHT.
COMPENSATING STEERING GEAR FOR ROAD PLANERS.
APPLICATION FILED FEB. 7, 1917.

1,300,697. Patented Apr. 15, 1919.

WITNESS:
Bernard Rural

INVENTOR.
George W. Cartwright
BY
Percy Webster
ATTORNEY.

UNITED STATES PATENT OFFICE.

GEORGE W. CARTWRIGHT, OF SACRAMENTO, CALIFORNIA.

COMPENSATING STEERING-GEAR FOR ROAD-PLANERS.

1,300,697.  Specification of Letters Patent.  Patented Apr. 15, 1919.

Application filed February 7, 1917. Serial No. 147,268.

*To all whom it may concern:*

Be it known that I, GEORGE W. CARTWRIGHT, a citizen of the United States, residing at Sacramento, in the county of Sacramento, State of California, have invented certain new and useful Improvements in Compensating Steering-Gears for Road-Planers; and I do declare the following to be a full, clear, and exact description of the same, reference being had to the accompanying drawings, and to the characters of reference marked thereon, which form a part of this application.

This invention relates to improvements in road planers or finishers particularly of that type shown in my application for patent for "road planer" filed Nov. 1, 1916, Serial No. 128,892.

The present application relates to a steering gear for turning the axes of the rollers of a road planer in a horizontal, accurate and satisfactory manner for steering the device around corners or curves of different degrees and in such a manner as not to drag or strain the machinery of the planer nor to scrape or injure the surface of the street or road.

In order to properly turn the entire structure, it is necessary that the axes of all of the rollers to the front and rear of the center roller must be turned horizontally, and, since they are in different relative positions with respect to the length of the machine, they must be turned at different relative speeds in order to follow the proper line of curvature in making the turn. It is obvious that the rear rollers cannot automatically turn and follow the front rollers but they must be forced to turn by connected gearing operated from a common steering wheel. Due to the fact that each must turn in a different relative degree, it becomes necessary to so construct and direct the gearing that it will turn the axes of all the rollers horizontally in a proper degree of curvature with respect to a variable common center in order that they will all properly follow around a curvature of any desired degree as the device is steered.

The aim of my invention therefore is to provide a connected gearing operated from a common source whereby all of the axes of the consecutively arranged rollers will be simultaneously turned for the purpose of steering the machine, which turning operation will be so arranged that the movement of the axis of each roller will be so timed with respect to the axes of the other rollers that all will turn on a curvature having a common center.

To do this I provide a steering apparatus that changes the line of direction of the axis of each roller or set of rollers horizontally in such degree that if the lines of direction of all the axes were sufficiently extended, they would meet at a common point, or center. The larger the curve upon which the road planer is moving, the more remote would be this common point or center.

A further object of the invention is to produce a simple and inexpensive device and yet one which will be exceedingly effective for the purposes for which it is designed.

These objects I accomplish by means of such structures and relative arrangement of parts as will fully appear by a perusal of the following specification and claims.

In the drawings similar characters of reference indicate corresponding parts in the several views.

Figures 1, 2:
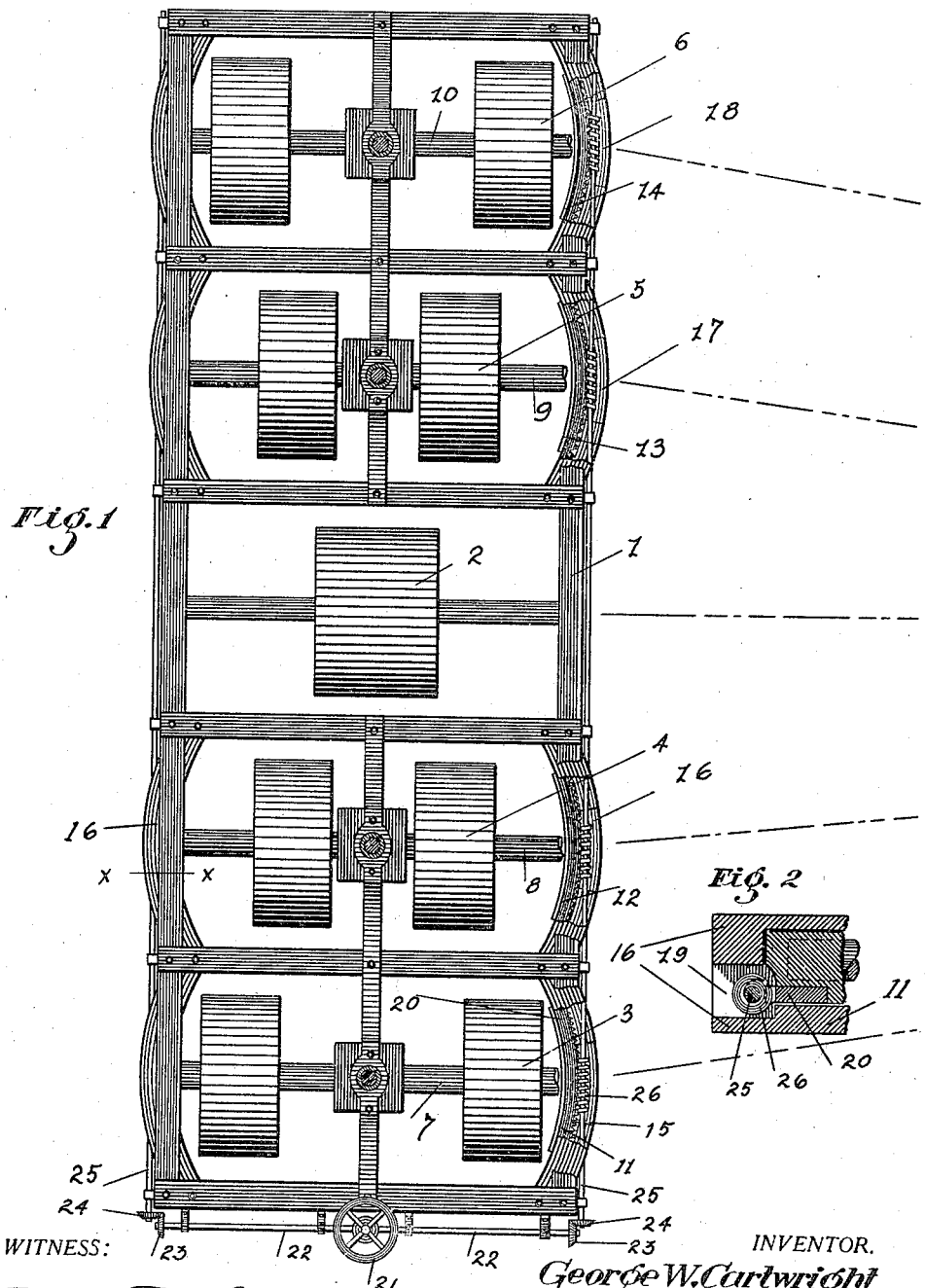
Figure 1 is a top plan view of my improved road planer partly broken out and in section to show my improved method of steering the same.
Fig. 2 is a sectional view of a bearing guide member taken on a line X—X of Fig. 1.

Referring now more particularly to the characters of reference on the drawings, the numeral 1 designates the rigid supporting frame for the rollers. Journaled centrally on this frame is a central roller 2 and to the front and rear of this roller 2 are disposed the other series of rollers 3, 4, 5 and 6 respectively. If desired, of course, a greater number of series of rollers may be used, but the principle and operation will be the same. These series of rollers are mounted on common operating shafts or axes as at 7, 8, 9 and 10 respectively. Each shaft has its ends journaled in a pair of supporting curved bearings as at 11, 12, 13 and 14 respectively.

These bearing members are guided in curved guides as at 15, 16, 17 and 18. The guide members 15, 16, 17 and 18 are provided with cut out recesses 19 into which project pinion racks 20 on the corresponding members 11, 12, 13 and 14.

The numeral 21 designates a common steering wheel disposed at any suitable point on the frame 1 and operable to drive two steering rods 22, one projecting to each side of the frame 1 and having on its outer end a small beveled gear 23. These beveled gears 23 in turn drive small beveled gears 24 on rods 25 which project along the side of the frame 1 and through the guide members 15, 16, 17 and 18 where, within the recesses 19, they are provided with worm gears 26 intermeshing with the pinion racks 20. In practice, since the two front series of rollers must turn in one direction and the two rear series of rollers must turn in the opposite direction, in order to give the same curvature in making the turn of the complete machine, those worm gears 26 which drive the four forward pinion racks 20 are pitched the opposite to those which drive the four rear pinion racks. Also the pitch of the worm gears which drive each succeeding series of rollers must be different in order to compensate for the difference in movement necessary to allow them all to follow the same curvature. Therefore these worm gears are so pitched that with relation to their different positions, they will turn the axes of the several series of rollers on a curvature having a common center as is shown for instance by the radiating lines in Fig. 1.

I accomplish the above construction and operation by making each of the worms especially for the particular axle to which it is to be connected and each of the threads of each worm is especially cut at the necessary pitch whereby each pinion will drive its corresponding axle at the required speed to perform the function set forth above.

Thus it will be seen by the operation of the common steering wheel 21 that the two rods 22 and the two rods 25 will be driven in unison therewith. The action of the worm gears 26 meshing with the pinion racks 20 will turn all the axes of the several series of rollers in unison horizontally. Also the pitch of the worm gears being properly proportioned will cause all the axes of the several series of rollers to turn at the proper relative speed and on a curvature having a common center so that the planer in making a turn will have no tendency to drag but will be steered in a perfect, true curve. This will prevent the steering action of the machine from dragging on any part of the machine or against the road surface, which latter action would be very detrimental to both.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. The combination with a perpendicularly rigid frame, of a plurality of axles arranged in consecutive order on the frame, a single steering rod common to all the axles, worms on the rod connected in driving relation with the axles, the pitch of the threads of the successive worms being varied whereby with the operation of the rod all the axles will be steered horizontally in arcs having a constant common center irrespective of the radii of the arcs.

2. A device of the character described comprising the combination with a road planer consisting of a frame and a series of shafts carrying rollers arranged in consecutive order within the frame, of a means for steering said rollers comprising a common steering wheel, means interposed between the steering wheel and the shafts for turning all of the shafts horizontally and in unison with each other on a curvature having a common center, such means comprising curved bearing members supporting the shafts, curved guides, the bearing members being movable in the guides, a pinion rack on each bearing member, a worm gear intermeshing with each pinion rack, and means for turning all of the worm gears with the common steering member.

3. A device of the character described comprising the combination with a road planer consisting of a frame and a series of shafts carrying rollers arranged in consecutive order within the frame, of a means for steering said rollers comprising a common steering wheel, means interposed between the steering wheel and the shafts for turning all of the shafts horizontally and in unison with each other, such means comprising curved bearing members supporting the shafts, curved guides, the bearing members being movable in the guides, a pinion rack on each bearing member, a worm gear intermeshing with each pinion rack, and means for turning all of the worm gears with the common steering member, the pitch of said worm gears being varied so that the said shafts will be turned at a proper relative speed to cause them to move on a curvature having a common center.

In testimony whereof I affix my signature.

GEORGE W. CARTWRIGHT.